Aug. 19, 1941.  A. L. McKINNON  2,252,976
LINK FOR ANTISKID CROSS CHAINS
Filed Aug. 31, 1939
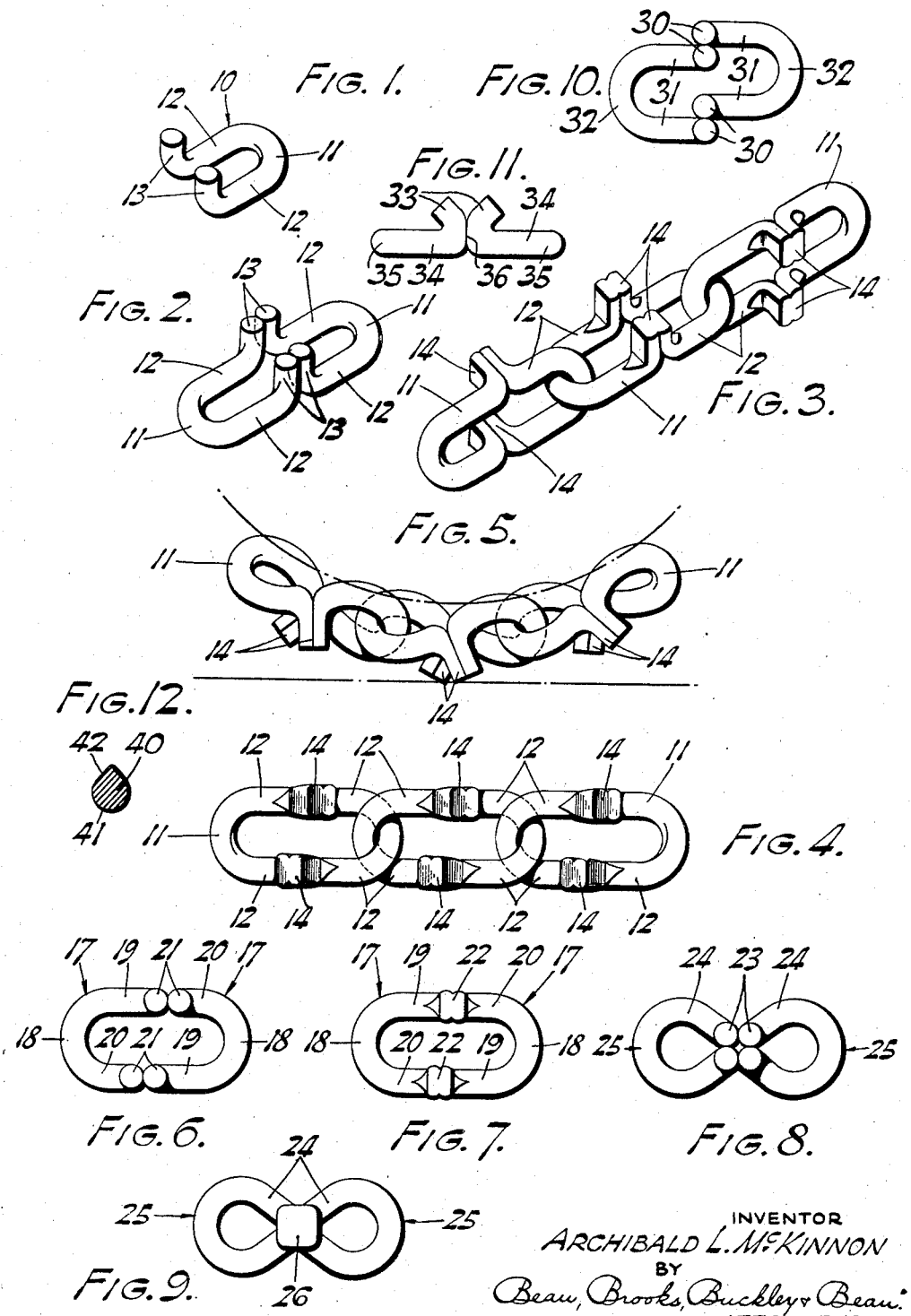
INVENTOR
ARCHIBALD L. McKINNON
BY
Bean, Brooks, Buckley & Bean
ATTORNEYS Patented Aug. 19, 1941

2,252,976

UNITED STATES PATENT OFFICE 2,252,976

LINK FOR ANTISKID CROSS CHAINS

Archibald L. McKinnon, St. Catharines, Ontario, Canada, assignor to Columbus McKinnon Chain Corporation, Tonawanda, N. Y., a corporation of New York Application August 31, 1939, Serial No. 292,835

2 Claims. (Cl. 152—243)

My invention relates in general to links for cross chains of anti-skid devices in which protuberances are formed on the road-engaging side of the chain for increasing the traction or antiskid properties of the chain, as well as the durability thereof.

It is well known to those skilled in the art that the usual link in anti-skid tire chains is curbed and made of round stock. When this link is subjected to wear by contact with the roadway, the contacting curved surfaces at the ends of the link are positioned tangentially to the flat surface of the roadway when the chain is new, and these surfaces wear down by reason of the repeated contact with the roadway whereby flat surfaces are formed. When these flat surfaces occur, obviously the strength of the link is greatly minimized and, under these conditions, if the chain links do not break under abnormal strain, they finally are weakened by wear and break under ordinary usage, thus permitting separation of the portions of the chain lying on each side of the broken link and rendering the cross chain useless.

Many attempts have been made to strengthen such links by providing protuberances of various sorts at the portions exposed to wear. Instead, however, of attempting only to reinforce the surface of the link which is subjected to wear, my invention is directed to the provision of gripping projections so positioned and proportioned as to contact with the road and take the wear for some considerable time before the curved surfaces at the ends of the link are brought into non-skid coaction with the road. Not only do the gripping projections of my link provide initial sharpened gripping surfaces when the chain is first placed in use, which is not so in the ordinary twisted link of round cross-section, but the life of my link is greatly prolonged. Furthermore, since initial wear in my link is taken by the projections, the tire with which it is used is not subjected for so long a time to the wear or injury resulting from the usual sharpened edges produced eventually by the flat worn surfaces at the curved portions of the links.

The principal object of my invention therefore has been to provide a link for cross-chains having gripping projections arranged substantially midway the length of the link.

Another object has been to place the gripping projections in such positions and to make them of such proportion that they will contact with the roadway and perform their gripping functions for a considerable time before the curved tangential portions of the link are brought into antiskid contact with the road, thereby greatly increasing the life of the cross chain.

Furthermore, the gripping projections of my link, after being twisted, are offset so that one projection does not follow in the track of the other projection. Moreover, it has been an object to provide an anti-skid link having gripping projections formed by the welded portions of the sections making up the link.

The above objects and advantages have been accomplished by the chain link shown in the accompanying drawing, of which:

Fig. 1 is a perspective view of one of the section elements making up my link;

Fig. 2 is a perspective view showing two of the sections assembled in position ready to be welded;

Fig. 3 is a perspective view of a number of completed links after being assembled in a chain, and having their ends welded;

Fig. 4 is a plan view of a portion of a completed chain as it appears after having been twisted;

Fig. 5 is a side elevation of the chain shown in Fig. 4 in the position it occupies when in use;

Fig. 6 is a plan view of a link made from two sections having unsymmetrical leg portions;

Fig. 7 is a plan view of a completed untwisted link formed of sections shown in Fig. 6;

Fig. 8 is another modified form of link showing all of the end portions of the sections brought together in a cluster;

Fig. 9 is a plan view of the link of Fig. 8 with the ends welded and forming a single gripping projection;

Figs. 10 and 11 show modified forms of links; and

Fig. 12 shows a modified form of wire stock.

Referring now to the form of invention shown in Figs. 1 to 5 inclusive, my link is made up of two sections 10, each comprising substantially one-half of the completed link. The wire stock used in making these links may be of any suitable cross-section, but for convenience I have shown it round. Each of these sections is preferably of general U-shape having a body part 11 formed with leg portions 12, each terminating in an upturned end portion 13. Each of these portions 13 is bent at an angle of substantially 90° to the leg portion 12, and they project from the same side of the link and lie preferably in the same plane transversely of the link. The end portions are also so positioned that they lie in parallel planes extending longitudinally of the section so that when two sections are in assembled positions, adjacent upstanding end portions of the sections abut each other, as shown in Fig. 2.

After the two sections of the link are arranged as shown in Fig. 2 and held in this position by suitable electrode clamping means, the adjacent upstanding end portions 13 of each pair are welded together forming gripping projections 14 as clearly shown in Fig. 3. Any suitable means may be employed for welding the ends and I preferably accomplish such welding by the use of electricity which acts preferably in conjunction with the clamping means, as above stated.

Obviously, before the sections of the second and each successive link are welded, the link parts are assembled in a previously formed and welded link so that when the assembling steps are completed the chain will have the appearance shown in Fig. 3. When assembling adjacent links, the end portions thereof are so relatively positioned that the gripping projections 14 of one link formed by welding such portions are arranged substantially at right angles to the gripping projections of the previously welded link, and in such directional relation that when the links are assembled and welded the gripping projections of the completed, untwisted chain will be arranged in helical form, as clearly shown in Fig. 3.

After my links have been assembled in a chain as just above described, the completed chain is twisted from end to end until the chain assumes the form shown in Figs. 4 and 5. If the gripping projections of the links are arranged in clockwise direction, as shown in Fig. 3, then the twisting of the completed chain from end to end is also carried out in a clockwise direction. As shown in Figs. 4 and 5, after the link is twisted, the two oppositely arranged gripping projections 14 of each link are staggered or offset. When the link is being twisted, the gripping projections 14 which, as hereinbefore stated, are formed at substantially right angles to the body part 11, maintain such right angle relationship with the body part, with the result that after the link is twisted the top surfaces of these projections will be inclined, as shown in Fig. 5, thereby presenting to the roadway sharpened edge surfaces which effectively prevent skidding. Even when these projections are worn down and the two working surfaces thereof lie in substantially the same plane, the peripheral edges of the projections will effectively grip the roadway and continue to provide effective non-skid surfaces.

The upstanding end portions 13 are so proportioned that when they are welded together and form the gripping projections 14, the outer surfaces of such gripping projections will extend considerably beyond the curved faces of the body part of the link nearest the roadway when the link is lying thereon, thereby keeping these curved surfaces of the links substantially out of wearing contact with the roadway until the gripping projections are worn down to the place where their gripping surfaces lie in the same plane as that occupied by such curved surfaces of the links, which greatly increases the life of the links.

From Fig. 5 it will be obvious that after the links are twisted the gripping projections 14 are staggered and will not track one another when the chain is moved laterally in service, whereby the gripping area of each link is extended lengthwise of the link.

Where it is desired to have the gripping projections of a finished chain in line with one another longitudinally of the link, or where it is desired to have the spread of these projections greater than that shown in Fig. 5, the modification of Fig. 6 may be employed and either of the results above mentioned attained by twisting the link clockwise if tracking of the projections is desired, or counterclockwise if greater spread is desired. As shown in Fig. 6 each link section 17 is provided with a body part 18 comprising legs 19 and 20 shaped in general U-shape formation. The leg 19 is preferably longer than the leg 20 and the upstanding end portions 21 thereof are, therefore, offset longitudinally in relation to each other. These link sections are substantial duplicates as in the other form of invention and when the link parts are assembled, as shown in Fig. 6, the adjacent upstanding portions 21 will be brought into contact with each other after which they are welded in a manner similar to that hereinbefore described, thereby forming gripping projections 22, as shown in Fig. 7.

If desired, the link sections may have their leg portions closed, as shown in Fig. 8, and the upstanding portions 23 thereof nested together and welded in one solid projection. As shown in this figure, these upstanding portions 23 of each section are brought together in contact with each other by causing the leg portions 24 of the body part 25 to be bent inwardly toward each other so that when a link is assembled the upstanding portions 23 of one section will contact with similar portions of the other section, and thus form one single gripping projection 26, shown in Fig. 9, when the upstanding portions are united by welding.

In making my link, any suitable well-known apparatus may be used and link stock of any suitable cross-sectional shape may be used to form the link sections, which are bent in U-shaped form, by means of such well-known apparatus, thus providing leg portions 12. After being bent in U-shaped form, each of the body parts 11 of the sections shown in Figs. 1 to 5 inclusive is firmly held while the end portions 13 are bent in the same direction and at substantially right angles to the leg portions. As hereinbefore pointed out, two of such previously formed sections are arranged in opposite directions, as shown in Fig. 2, with their opposite upstanding portions 13 adjacent each other and abutting. In this position each pair of adjacent end portions is securely grasped by suitable and well-known welding mechanism (not shown) and the metal thereof is subjected to suitable heat and pressure to bring about a welding of the end portions, thus uniting the material of the two pairs of adjacent upstanding portions 13 and forming the gripping projections 14 of the completed link, as shown in Fig. 3.

When a link of the form shown in Fig. 10 is being made, the upstanding portions 30 formed at the end of the leg portions 31 are so arranged, previous to welding, that the body portions 32, as well as the leg portions, will be in offset or staggered relation, as clearly shown in this figure. In the form of this figure, the upstanding end portions are preferably arranged at right angles to the leg portions 31, as in the other form of invention.

The form of invention shown in Fig. 11 comprises end portions 33 which are bent backwardly toward the leg portions 34 and each assumes an angle with such leg portion which is considerably less than 90°. When the link sections of this form of invention are welded together, the weld obviously does not extend the full length of the end portions 33 but only over an area indicated by the line 36. This leaves the extremities of the end portions 33 extending away from each other in opposite directions as shown in Fig. 11, whereby additional projections are provided on the link.

Obviously, as hereinbefore pointed out, the link sections are engaged with a previously formed link as they are assembled and before the end portions thereof are welded. After the desired number of links have been assembled and welded, the chain thus formed is twisted by any suitable and well-known means as, for instance, a lathe, not shown. As hereinbefore pointed out, the link sections forming adjacent links are so assembled with respect to each other that the projections formed by welding the upstanding portions of one link are arranged at right angles to the projections of the next link. Such right angled relationship of the projections of succeeding links is in the same rotative direction around the axis of the chain and is, therefore, of helical form when viewed from either end of the chain. In order to bring all of the gripping projections on one side of the finished chain after twisting, it is necessary that the ends of the chain be relatively twisted in a direction which is the same as the direction of helical arrangement of the links before twisting.

While I have shown my links made of wire of substantially round cross-section, it is obvious that wire having a cross-section of any other shape may be used, as for instance the shape of the stock 40 shown in Fig. 12, where a substantially semi-cylindrical tire-engaging surface 41 is formed on one side and a sharp road-engaging surface 42 on the opposite side thereof. Furthermore, while the projections formed by the welded upstanding ends are shown and described as being of such length that they will take the initial wear, they may be made shorter and so proportioned that they will contact with the roadway at substantially the same time as the curved anti-skid surfaces of the link.

Obviously, these and other modifications of the details of my link may be made without departing from the spirit of my invention or the scope of the appended claims. Furthermore, while I have not shown or described in detail any apparatus for carrying out my invention, it is obvious that any apparatus, well-known to those skilled in the art, may be used.

Having thus described my invention, what I claim is:

1. An anti-skid chain link composed of two U-shaped sections arranged end-to-end having each of their adjacent extremities disposed at an abrupt angle to the body of the section and extending from one side of the link and welded together to form a composite gripping projection at each side of the link with component parts thereof extending out from the link body in the same direction, whereby both extended extremities of each section will be presented to the road surface.

2. An anti-skid chain link composed of two duplicate U-shaped sections arranged end-to-end having each of their adjacent extremities disposed at an abrupt angle to the body of the section and extending from one side of the link and welded together to form a composite gripping projection at each side of the link with component parts thereof extending out from the link body in the same direction, whereby both extended extremities of each section will be presented to the road surface.

ARCHIBALD L. McKINNON.